Oct. 2, 1934.                H. C. FOLGER                1,975,540
              VENDING AND DISPENSING APPARATUS
              Filed Oct. 3, 1930        5 Sheets-Sheet 1
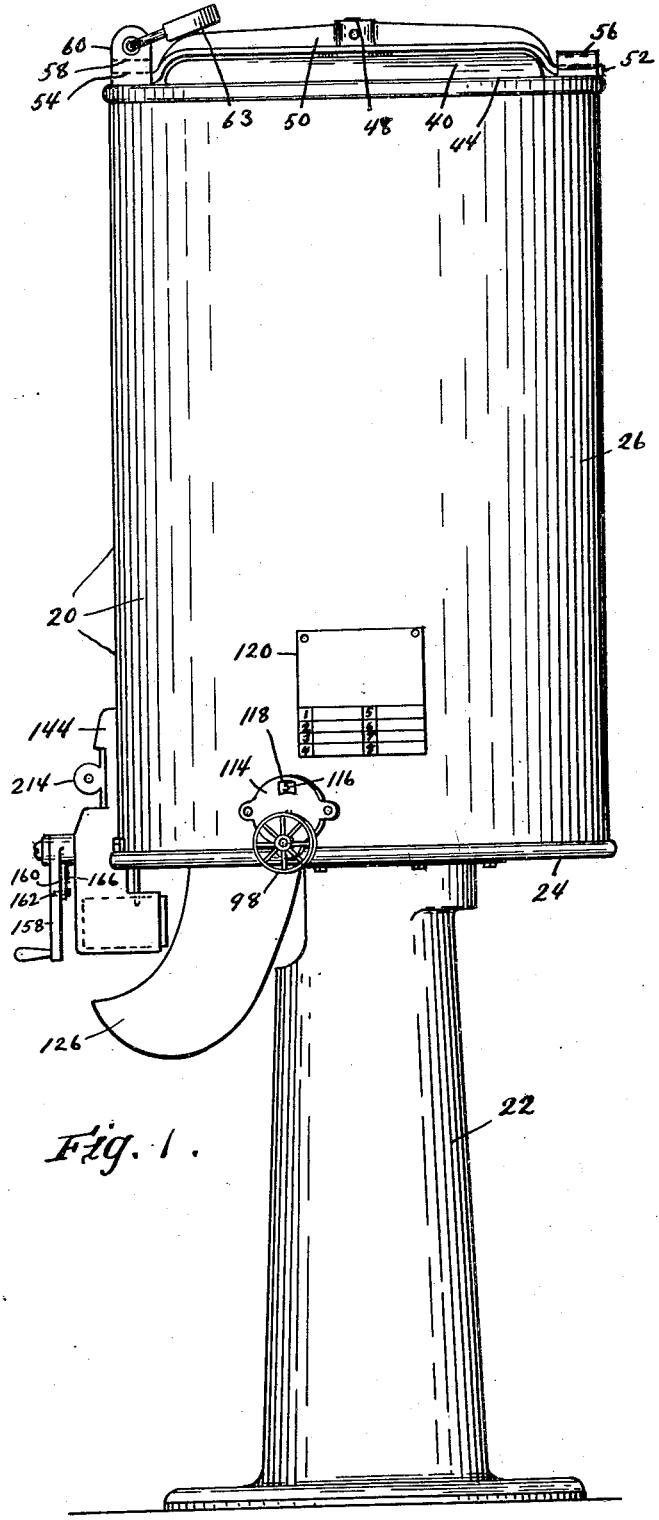
Fig. 1.
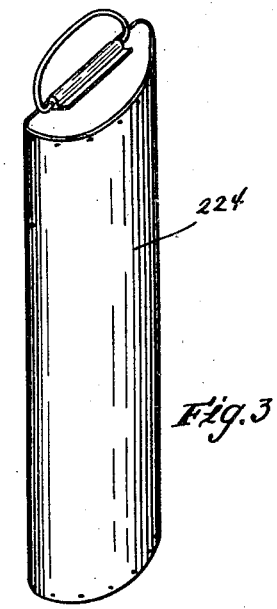
Fig. 3.
Fig. 2.
Inventor.
Henry C. Folger

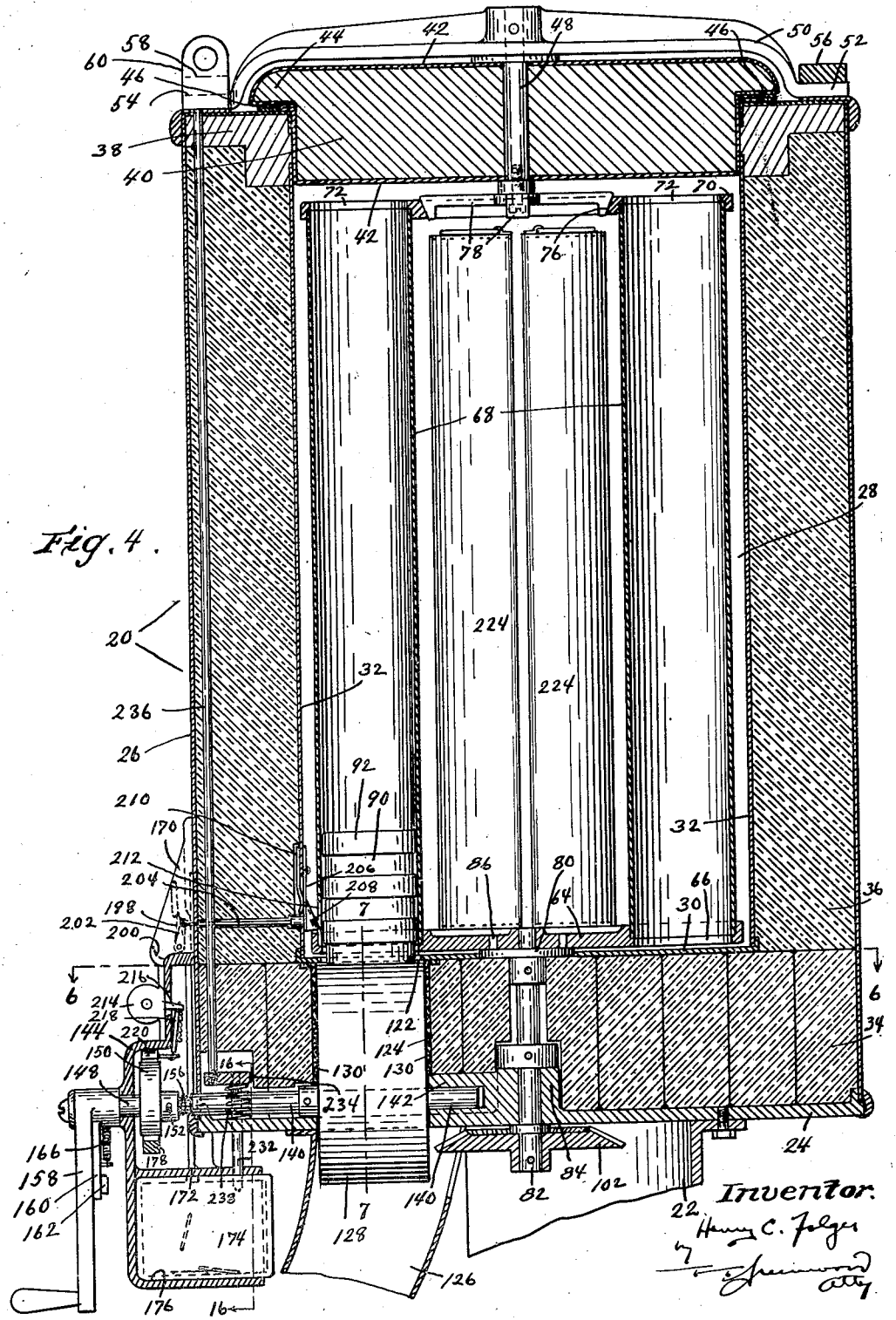

Oct. 2, 1934.    H. C. FOLGER    1,975,540
VENDING AND DISPENSING APPARATUS
Filed Oct. 3, 1930    5 Sheets-Sheet 3
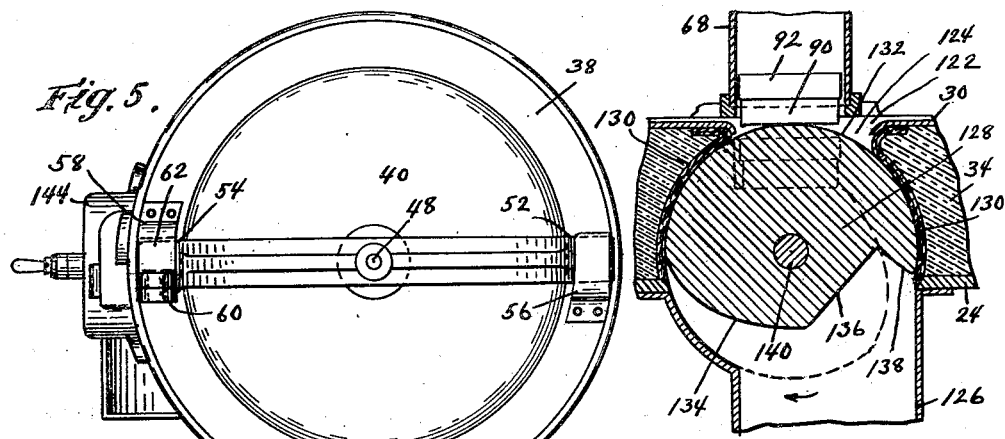
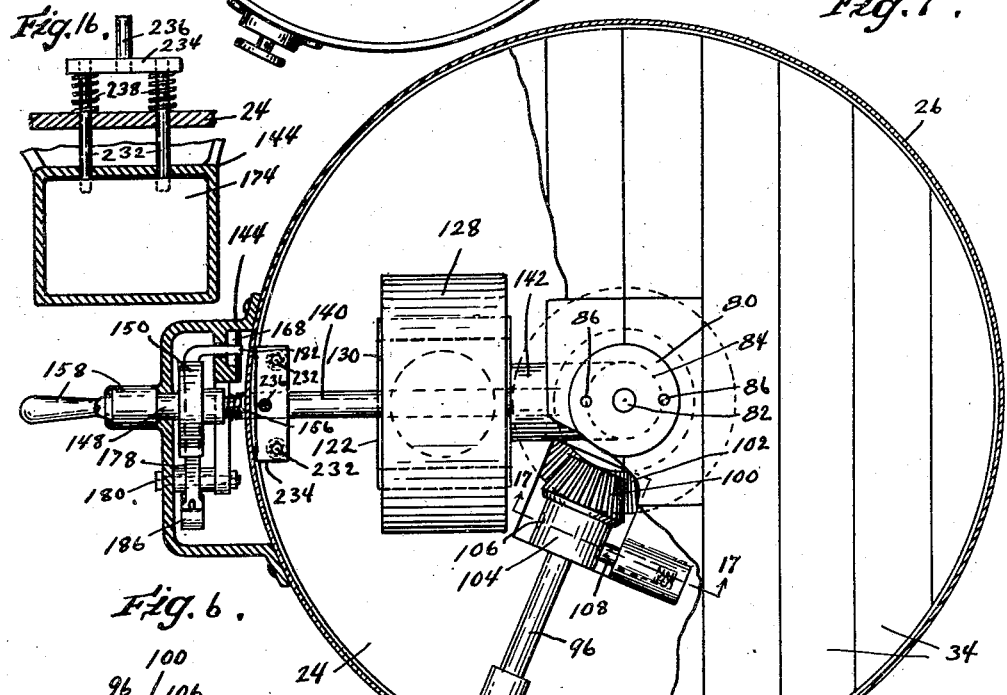
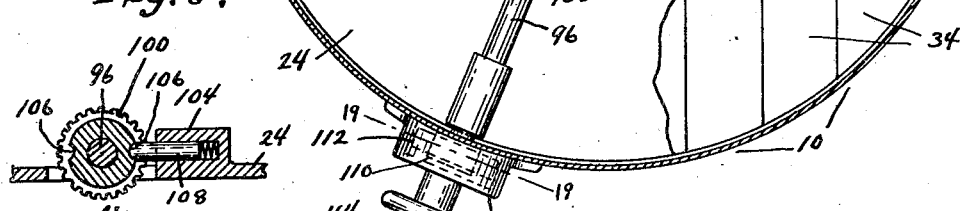
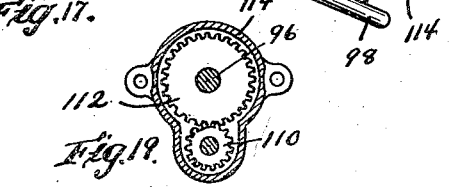

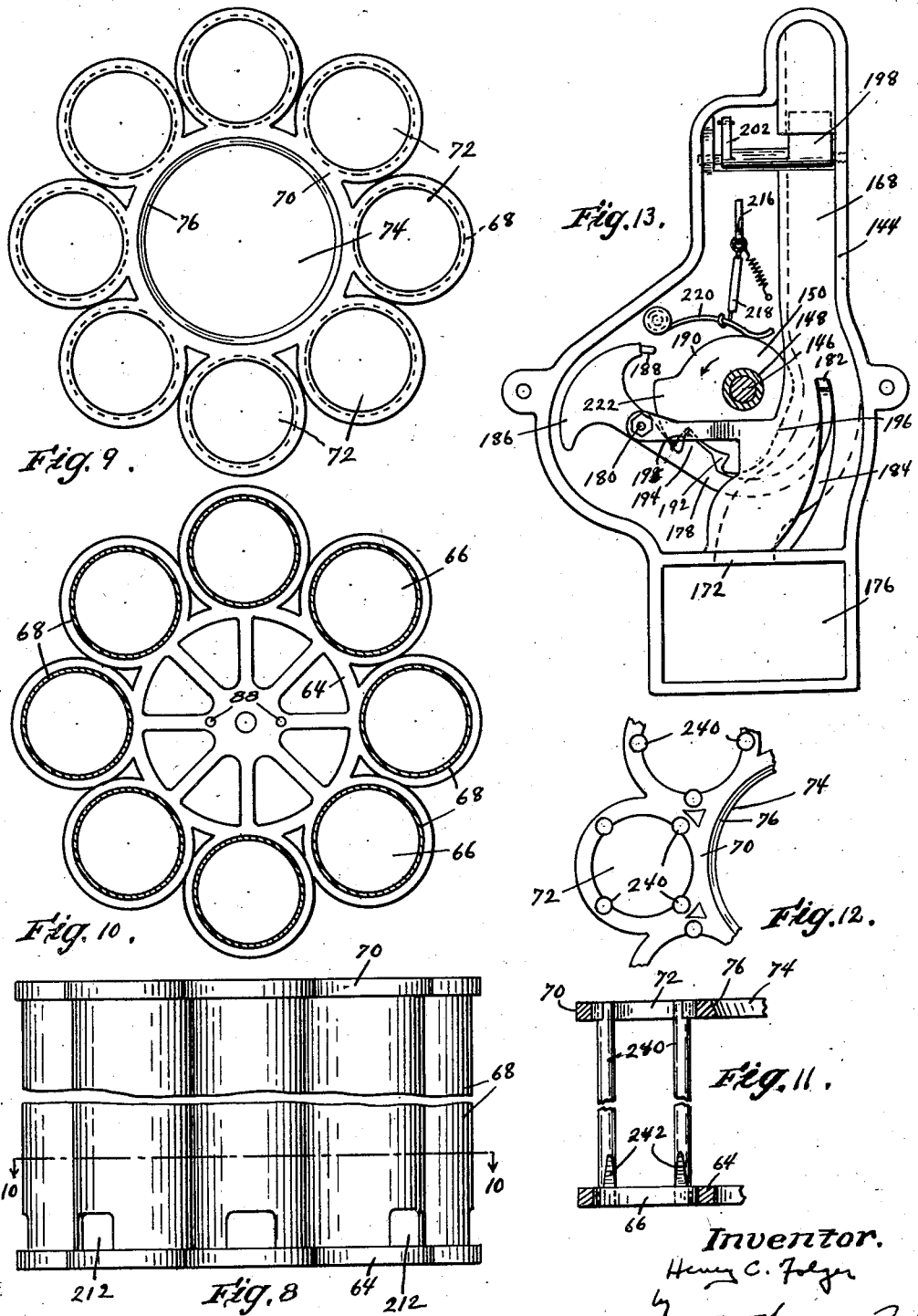

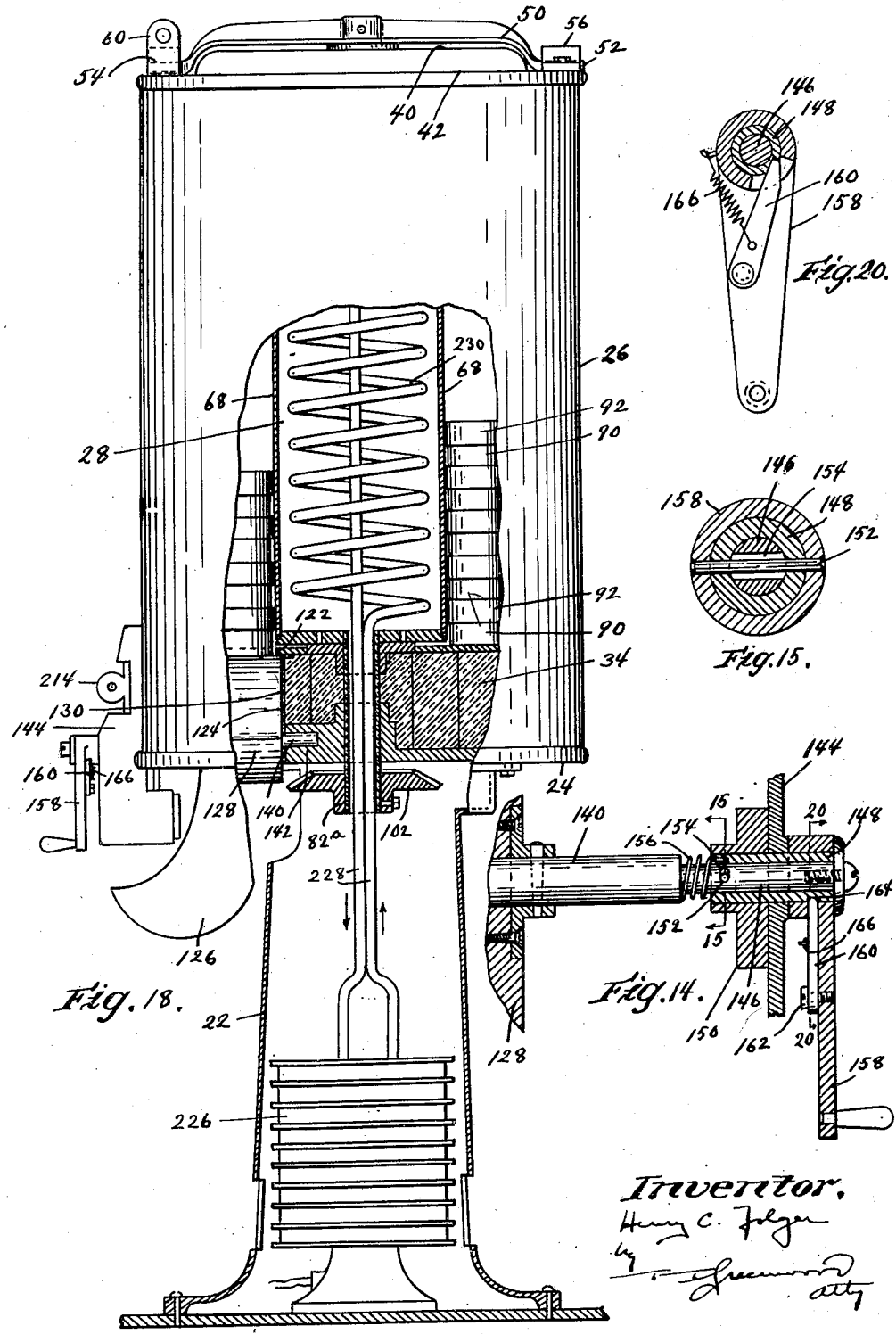

Patented Oct. 2, 1934

1,975,540

UNITED STATES PATENT OFFICE 1,975,540

VENDING AND DISPENSING APPARATUS

Henry C. Folger, Belmont, Mass., assignor to H. C. Folger Company, Boston, Mass., a corporation of Massachusetts Application October 3, 1930, Serial No. 486,166

4 Claims. (Cl. 312—36)

This invention relates to dispensing and vending apparatus that is especially adapted for the dispensing of cold or frozen products, and particularly ice cream.

One of the objects of the present invention is the provision of an ice cream vending apparatus that is adapted to contain a plurality of flavors of ice cream contained in unit containers, and has means by which a container of ice cream of any selected flavor can be dispensed.

Another object of the invention is the provision of an ice cream vending machine having an improved construction by which a large variety of different flavors of ice cream can be dispensed and also maintained refrigerated for long periods of time.

Another object of the invention is the provision of an ice cream vending machine having a refrigerated compartment containing unit containers of ice cream and a delivery passage through which the unit containers pass when the machine is operated, combined with means for maintaining said passage sealed against free communication with the atmosphere at all times and particularly at the time a container is being dispensed.

Another object of the invention is the provision of an ice cream vending machine having a self-contained, mechanically-operated refrigerating unit which maintains the ice cream container compartment at a low temperature for indefinite periods.

A further object of the invention is the provision of a coin-controlled ice cream vending machine having a coin box into which the coins pass after they have conditioned the machine for operation and means to lock the box to the machine so that it can not be removed except when the locked ice cream container compartment is opened for the purpose of replenishing either the ice cream or the refrigerant.

A further object is generally to improve the construction and operation of vending and dispensing machines.

Fig. 1 is a side elevation of an ice cream vending machine embodying the present invention.

Fig. 2 is a perspective view of one of the ice cream containers or packages used in connection with the machine.

Fig. 3 is a perspective view of one of the refrigerated cartridges used for refrigerating the ice cream containing compartment of the machine.

Fig. 4 is a vertical sectional view taken through the axis of the machine of Fig. 1.

Fig. 5 is a plan view of the machine.

Fig. 6 is a sectional view taken along line 6—6 of Fig. 4.

Fig. 7 is a sectional detail taken along line 7—7 of Fig. 4.

Fig. 8 is a side elevation of the rotatable holder for the ice cream container.

Fig. 9 is a plan view of the holder of Fig. 8.

Fig. 10 is a sectional view taken along line 10—10 of Fig. 8.

Fig. 11 is a fragmentary sectional elevation of a modified form of holder.

Fig. 12 is a plan view of the modified view of Fig. 11.

Fig. 13 is an elevation looking into the interior of the enclosing casing of the coin controlled mechanism.

Fig. 14 is an enlarged sectional detail of the operating shaft and handle shown in Figs. 4 and 6.

Fig. 15 is a section taken along line 15—15 of Fig. 14.

Fig. 16 is a section taken along line 16—16 of Fig. 4.

Fig. 17 is a sectional detail taken along line 17—17 of Fig. 6.

Fig. 18 is a side elevation partly in section of a modified form of vending machine having a self-contained electromechanically actuated refrigerating mechanism.

Fig. 19 is a section along line 19—19 of Fig. 6.

Fig. 20 is a section along line 20—20 of Fig. 14.

As here shown, the vending machine embodying the present invention comprises a dispensing cabinet 20 of upright cylindrical configuration supported upon the top of a hollow pedestal 22. Said cabinet, as is best shown in Fig. 4, includes a circular base plate 24 and an upright cylindrical metal wall 26. A refrigerated compartment 28 is located within the cabinet and is composed of a circular bottom wall 30 and an upright cylindrical side wall 32. Both of said walls are spaced from the confronting walls of the cabinet and are insulated therefrom by suitable insulating material 34 and 36. The insulating material 34 preferably comprises sheet cork and the insulating material 36 preferably is of a loose or fluffy fibrous nature which is packed between the walls 32 and 26. The annular space between said walls is closed at the top by an insulating ring 38 which can be of wood. The refrigerated compartment 28 is closed at the top by a removable insulating cover 40 which has the metal top and bottom faces 42. The cover 40 fits within the top opening of the refrigerated compartment and has a flange 44 which overlies the top face of the ring 38. The lower metal cover face 42 extends upwardly over the annular side wall of the cover and terminates under the flange where it pinches an annular sealing gasket 46 against the flange. The gasket 46 lies against the under face of the flange and bears against the top face of the ring 38 to provide a tight closure for the top of the compartment when the cover is in closing position. An insulating shaft 48 is carried axially by the cover 40 and extends above the top thereof and carries a clamping bar 50 which overlies the cover and has its free ends 52 and 54 disposed respectively under the ears 56 and 58 carried by the top of the cabinet whereby to hold the cover in position.

When the bar 50 is rotated sufficiently to clear said ears, the cover can be removed and access gained to the interior of the refrigerated compartment. The end 54 of the locking bar is provided with an upstanding lug 60 which confronts a similar lug 62 of the ear 58 when the bar is in cover clamping position. Said lugs have aligned apertures therein through which the hasp of a padlock 63, see Fig. 1, can be passed to lock the cover to the cabinet.

A holder for the ice cream containers is located rotatably within the refrigerated compartment 28. Said holder, as is best shown in Figs. 4, 8, 9 and 10, comprises a bottom plate 64 which closely overlies the bottom wall 30 of the refrigerated compartment and has a plurality of circular openings 66 arranged concentrically with the axis of the plate in alignment with which upstanding container-supporting tubes 68 are carried. The upper ends of said tubes are received within recesses in a top plate 70 in alignment with circular passages 72 therein. The top plate is provided with a large central circular opening 74 therein which has a bevelled inner face 76. The insulating shaft 48 of the cover supports at its lower end a rotatable spider having arms 78 which, when the cover is in closing position, seat upon the bevel face 76 and thereby provide a rotatable support for the upper end of the holder. The bottom plate 64 of the holder rests upon a flange 80 of a vertical insulating shaft 82 which is journalled in a hub 84 of the bottom plate 24 of the cabinet and extends downwardly therebelow. Said flange 80 is provided with a pair of upstanding pins 86 which are loosely received in apertures 88, see Fig. 10, of the plate 64 and thereby establish a disengageable driving connection with said shaft so that the holder can be removed from the compartment when desired by merely raising it out of the compartment.

The tubes 68 of the holder are adapted to receive vertical stacks of superimposed ice cream containers 90 one of which is illustrated in Fig. 2. The container consists of a stiff shell of paper or other suitable material in which a supply of ice cream of any suitable flavor is received. The container is closed by a cover 92. A spoon 94 is or can be carried removably by the cover under the down-turned lip at the top thereof. The containers in one tube are intended to have the same flavor of ice cream. Each tube, however, may contain a different flavor of ice cream so that with a proper knowledge of the location of the flavors, any selected flavor can be dispensed. The stacks of ice cream containers in the tubes 68 rest upon the bottom wall 30 of said refrigerated compartment and are slidable thereover as the holder is rotated to locate any selected tube into delivery position.

Means are provided by which the holder can be rotated to bring a selected tube into delivery position. Said means includes a horizontal shaft 96 which overlies the top face of the bottom plate 24 and extends outwardly beyond the outer wall 26 of the cabinet and is terminated in a hand wheel 98 or other suitable means by which the shaft can be rotated. A pinion gear 100 is fixed to the inner end of said shaft and extends through an opening in the bottom wall 25 and is in mesh with a pinion gear 102 fixed to the shaft 82. Thus, by rotating the shaft 96, the container holder can be rotated. The hub 104 of the pinion gear is provided with a pair of diametrically opposed peripheral recesses 106, see especially Fig. 17, into any one of which a spring-urged holding pin 108 can enter whereby to hold the shaft and the container stationary. The ratio of the gears 100 and 102 is such that a half rotation of the shaft 96 serves to move one container tube out of and the adjacent container tube into delivery position.

Indicating mechanism, see especially Figs. 6 and 19, is provided to indicate the position of the respective tubes 68 with respect to the delivery position. Said indicating mechanism comprises a small gear 110 fixed to the shaft 96 and which meshes with a large gear 112 that is located in an external casing 114 of the cabinet. Said gear 112 has a plurality of numbers or other suitable indicia 116 on its front face which are progressively visible through an aperture 118 in said casing so as to indicate which tube is at a delivery position. The outer wall of the cabinet preferably carries a plate 120, Fig. 1, which bears a series of numbers corresponding with the number of container tubes and against which numbers the name of a particular flavor of ice cream may be indicated. Thus by inspecting the plate and ascertaining what number corresponds with the desired flavor, the wheel 98 can be rotated until that number appears in the window, an operation which will bring the proper tube into delivery position.

In the delivery position a tube is disposed above an aperture 122 in the bottom wall 30 of the container compartment, which aperture is in register with a passage 124 through the bottom insulation of the cabinet and communicates with a delivery chute 126 into which the individual cartons or containers fall into and lie at rest in an accessible position. The passage 124 is of general cylindrical shape and has parallel end walls and a circular side wall between which a cylindrical dispensing drum 128 of insulating material as wood is rotatably located. The end and circular walls of said passage are lined with layers 130 of felt or the like and snugly engage the dispensing drum 128 so that the interior of said refrigerated compartment 28 is sealed from communication with the atmosphere at all times so that leakage of cold air from the compartment is prevented.

The dispensing drum is provided with a circular face 132 which occupies about one-half of the circumferential length of the drum and provides a support for the lowermost container of whichever tube is in delivery position. A portion of the periphery of the drum is of spiral configuration as is indicated in 134 and extends from the cylindrical portion of the drum inwardly toward the center to a flat portion or shelf 136, from the other end of which shelf a ledge 138 upstands, see Fig. 7. As the drum is rotated in a clockwise direction as indicated by the arrow, the lowermost container 150 in the tube descends by its weight as the spiral portion 134 of the drum passes thereunder until the container rests upon the shelf 136 and is entirely clear of the tube 68. The upstanding ledge 138 then causes the container to be moved out from under the stack of remaining containers and revolves away from the tube and ultimately disposed into a position where it can fall into the delivery chute 126. The full line position of the drum shown in Fig. 7 illustrates the normal or inoperative position thereof, while the dotted line position of the drum illustrates the position at the time a container is delivered onto the shelf 136. The height of the ledge 138 is about equal to the height of a container so that the rotation of the drum brings the semi-circular portion 136 under the next to the lowermost container in the stack and thus supports the stack during the time that the lowermost container is being moved to delivery position.

The drum is fixed to an operating shaft 140 which has its inner end journalled in a hub 142 of the bottom plate 24 and has its outer end passed through and supported by the front wall of a casing 144 which is secured to the outer face of the outer wall 26 of the cabinet. Said shaft has the reduced end section 146 which passes loosely through a sleeve 148 that is journalled in the wall of said casing 144, see especially Fig. 14. A cam 150, see also Fig. 13, is received on said sleeve and is secured thereto by a rivet 152 which rigidly connects said sleeve and cam. Said rivet passes through an enlarged passage 154 of the reduced section 146 of the shaft so as to connect the sleeve and cam to the shaft but to allow a certain amount of lost motion therebetween for a purpose that will presently appear. A helical spring 156 surrounds said shaft 146 between the enlarged portion thereof and the inner end of the sleeve 148 and is connected to both so as to urge said sleeve for rotation in a counterclockwise direction with respect to Fig. 14.

An operating handle 158 is mounted loosely on the sleeve 148 and has a driving connection therewith by means of a pawl arm 160 which is pivoted on a screw 162 carried by the operating handle and has its other end located releasably in a notch 164 of the sleeve, a spring 166, see also Fig. 1, serving to hold the pawl releasably in the slot. The arrangement of the pawl and slot is such that the handle and sleeve are connected together for conjoint rotation in a clockwise direction and also so that the handle can rotate independently of the sleeve in a counterclockwise direction. This arrangement prevents improper operation of the mechanism.

The rotation of the shaft 140 is governed through the cam 150 by coin-controlled mechanism illustrated more particularly in Figs. 13, 4 and 6. Said coin-controlled mechanism is located within the casing 144, which casing contains a generally vertical coin passage 168 that has an entrance 170 in the top of said casing and has an exit passage 172 that is adapted to register with a coin passage in the top wall of a coin box 174, see Fig. 4, located in a compartment 176 that is open at the rear of the casing and under the bottom wall 24 of the cabinet. A coin-operated lever 178 is located within the casing and is pivoted on a pin 180 carried by the casing walls. One end of said lever is of arcuate configuration and has an upstanding horizontal end 182 that is extended across the lower portion of the coin passage and loosely through arcuate slots 184 in the front and rear walls of said passage. The other end of said lever is provided with a counterbalance weight 186 which is so adjusted that normally the other end 182 of the lever is maintained in the upper portion of said slots 182 but when a coin is deposited upon said lever, the weight of the coin is sufficient to overbalance the counter weight 186 and cause the free end of the lever to descend downwardly along the coin passage, until the projection 188 at the counter weighted end of the lever rests against the circular part 190 of the cam 150. The cam 150 has a notch 192 in its face and the coin operated lever 178 has a projection 194 that is normally received in said notch and engages a wall 195 thereof to restrain the cam from rotation in the counterclockwise direction indicated by the arrow. When, however, a coin is deposited in the chute and rests upon the free end of the lever, the projection 194 is caused to be removed from the notch 192 thereby to permit the cam and consequently the shaft 140 to rotate to deliver a container of ice cream. The cam is provided with a flattened portion 196 which rotates under the projection 188 to permit the free end of the coin-controlled lever to descend further in the coin chute and into a position to permit the coin to pass over the end of the lever and fall into the coin box 174. When the lever 178 is free from the coin, it rises by the action of the counterbalance weight 186 and falls into the cam notch 192 and thereby locks the shaft against rotation after it has made one complete rotation. When the pressure on the operating handle is released, the heretofore described spring 156 that connects the handle with the shaft rotates the handle and cam 150 backward for a sufficient amount to free it from frictional engagement with the coin controlled lever, thereby to free said lever from all restraint so that it can operate in the above described manner when a coin is deposited thereon.

Means are provided to return the deposited coin if the tube that is rotated into delivery position happens to be exhausted of a container. To this end, a switch plate 198 is pivoted to the casing 144 in front of the upper portion of the coin chute and behind a tray 200. The switch plate has an arm 202 that is connected by a rod 204, see Figs. 4 and 13, with a hinged plate 206 that is pivotally connected to the inner wall 32 of the refrigerating compartment above the delivery opening thereof. Said plate has a projection 208 that is urged by a spring 210 to enter any one of the apertures 212 in the side walls of the tubes at the bottoms thereof and into engagement with the lowermost container therein. If there is a container within the selected tube, the hinged plate is held against movement by the container and thereby holds the switch plate out of the coin passage. If, however, there happens to be no container in the selected tube, the hinged plate is free to move into the tube and thereby moves the switch plate into the coin chute under the delivery opening so that a coin deposited therein is caused to fall into the tray 200 where it can be picked up by the operator. The arrangement also prevents the depositing of a coin and the operation of the delivery drum where there is no tube in delivery position since the hinged plate then occupies the space between two adjacent tubes and causes a deposited coin to fall into the tray.

Counting mechanism is employed to record the number of containers dispensed between any specific apparatus. Said counting mechanism is of any well known form and is indicated generally at 214, Fig. 4, and is carried by the front wall of the casing 144 and has an operating arm 216 that is connected by a rod 218 with a pivoted lever 220 that rides upon the cam 150. A projection 22 of said cam raises said lever during each rotation of the cam and thereby actuates the counting mechanism once for each dispensing operation of the device.

The cabinet can be refrigerated in any suitable manner. The refrigerating medium is located between the tubes 68 of the holder. Preferably the refrigerating medium comprises the cartridges 224, see Figs. 3 and 4, which are well known in the refrigerating art and contain a liquid, as a brine solution for instance, which refrigerant can be cooled or reconditioned after its period of usefulness has been exhausted. The cartridges are introduced within the holder through the enlarged opening 74 in the top plate 70 and rest upon the bottom plate 64 and are rotatable therewith.

For some purposes the cabinet can be mechanically refrigerated. In Fig. 18 an electrically-actuated, self-contained refrigerating unit 226 is located in the hollow pedestal 22 of the apparatus and has pipes 228 for the liquid refrigerant and the heated gas that pass through a hollow shaft 82a that in other respects is similar to the shaft 82 of Fig. 4 and communicates with the refrigerating coil 230 that is located within the tubes 68 of the holder and has a heat-abstracting surface that cools the compartment. The refrigerating unit may be of any suitable or desirable type that has means by which it is operated automatically to maintain a constant reduced temperature within the refrigerated compartment.

Means are provided to lock the coin box or receptacle 174, see Figs. 4 and 16, to the cabinet so that the coin receptacle can not be removed except during the replenishing of the cabinet with ice cream containers or refrigerating cartridges, at which time the cabinet is intended to be opened and the coin box removed by an authorized person. To this end, locking pins 232 are slidably extended through the bottom plate 24 of the cabinet and into registering apertures in the top wall of the coin container. Said pins are carried by a yoke 234 that is connected to the lower end of a vertically movable rod 236 the top end of which is located under the ear 58 at the top of the cabinet. When the bar 50 that secures the cover to the cabinet is in position under said ear, it holds said rod 236 depressed and thereby holds the pins 232 into locking engagement with the coin box. When the bar 50 is removed, however, springs 238 that encircle said pins and bear against the bottom wall 34 operate to elevate said pins out of locking engagement with said box so that the pins can be withdrawn at the time the cover is to be removed. Thus a single lock secures the bar 50 to the top of the cabinet and prevents unauthorized removal of the coin box.

It may sometimes happen that, when there is but a single container in a tube 68, the container becomes tilted in the tube and may bind therein. To prevent this action, the construction illustrated in Figs. 11 and 12 can be employed. In this construction, the tubes 68 are replaced by sets of guide rods 240 which surround the aligned apertures 66, 72 in the upper and lower plates 64 and 70, respectively, of the holder. Said rods serve to support the stacks of containers in the holder equally as well as the tubes 68 and in some respects are preferable since the friction on the containers is reduced. The lower ends of the rods are cut away as indicated at 242 to provide an enlarged portion at the bases of the rods that has the height of one container. The lowermost container of the stack thus has increased peripheral clearance and so can not bind in the holder if it becomes tilted therein.

The invention may be otherwise modified without departing from the spirit of the invention.

I claim:

1. A vending machine comprising a cabinet having a compartment, a vertical holder located rotatably in said compartment having upper and lower spaced plates, and means located between said plates which provides support for a plurality of vertical stacks of superimposed articles, said upper plate having a passage therethrough between said stack-supporting means, a removable cover for said cabinet located above said upper plate, a spider carried rotatably by said cover which seats in said aperture and which constitutes means for supporting the upper end of said holder rotatably, means for rotating said holder to locate any selected stack in delivery position, and means for removing and delivering the lowermost article of a stack.

2. A vending machine comprising a cabinet having a compartment, a holder located rotatably in said compartment having means to support a plurality of vertical stacks of superimposed articles, means which rotatably supports the lower end of said holder, a removable cover for the open top of said cabinet, means carried rotatably by said cover which has a disengageable connection with the upper end of said holder for supporting it rotatably, means for rotating said holder to locate any selected stack in delivery position, and means for removing the lowermost article from a selected stack and delivering it into an accessible position.

3. A vending machine comprising means to hold a plurality of articles, mechanism which delivers said articles including a rotating shaft and an operating handle therefor, said operating handle having a projection, a latch which engages said projection and prevents rotation of said shaft in an operative direction, means which normally holds said latch in the path of said projection, means providing lost motion connection between said shaft and said operating handle, and a spring for moving said handle and the projection carried thereby away from said latch independently of a corresponding movement of said shaft, whereby to free said latch from engagement with said projection.

4. A vending machine comprising a holder for a vertical stack of superimposed articles, a drum which is rotatable to move the lowermost articles from said stack, an operating handle for said drum, a latch for holding said handle from rotation, and means connected between said handle and drum which rotates said handle in an inoperative direction away from said latch and independently of a corresponding movement of said drum.

HENRY C. FOLGER.